A. W. BURKE.
EXCESS WATTMETER.
APPLICATION FILED MAR. 2, 1915.

1,262,746.

Patented Apr. 16, 1918.

WITNESSES:
Joseph W. Harris
N. P. Leonard

INVENTOR:
Alfred W. Burke
by Byrnes Townsend & Beckenstein
ATT'YS.

UNITED STATES PATENT OFFICE.

ALFRED W. BURKE, OF WILMINGTON, DELAWARE.

EXCESS-WATTMETER.

1,262,746.

Specification of Letters Patent.

Patented Apr. 16, 1918.

Application filed March 2, 1915. Serial No. 11,484.

*To all whom it may concern:*

Be it known that I, ALFRED W. BURKE, a subject of the King of Great Britain, residing at Wilmington, in the county of New Castle and State of Delaware, have invented certain new and useful Improvements in Excess-Wattmeters, of which the following is a specification.

This invention relates to recording watt-meters, such as are used on alternating current circuits, for recording the electrical energy consumed in excess of a certain predetermined quantity, and has for its object to provide a compensator to automatically correct the error in watt-meters of this kind, due to an increase or decrease in line voltage. The invention is an improvement on that described in my Patent No. 1,175,508, patented March 14, 1916.

In my copending application, a neutralizing and balancing coil, of a predetermined electrical value, operates to neutralize and balance the series coil of the watt-meter, to the value of the electrical energy contracted for, any excess electrical energy used being recorded by the meter. With a line voltage of substantially constant value, the watt-meter records correctly, but with variations in the line voltage, errors are introduced as hereinafter described.

In the present case, the improvement consists in adding a compensator to correct the error due to the fluctuation in line voltage, whereby the accuracy of the meter is considerably increased, the function of the compensator being to supply an electromotive force, and also a current, of as nearly as possible constant value, to neutralize or balance potential at the terminals of, or the magnetic flux of, the series coil of the watt-meter, regardless of the variation in line voltage. The compensator is a specially designed transformer, operating at above the magnetic saturation point of the iron core, whereby a substantially uniform potential is induced in its secondary, notwithstanding considerable variations in the line voltage.

In the accompanying drawings—

Figure 4:
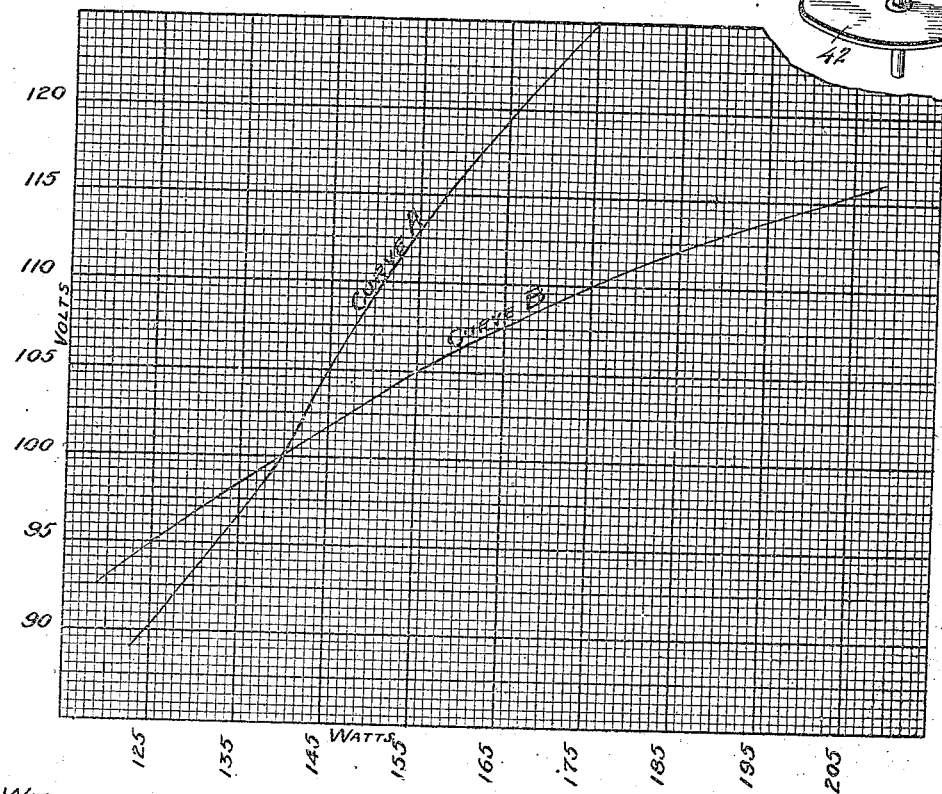

Fig. 4 gives curves showing the watts recorded at different voltages with and without the compensator.

Figure 5:
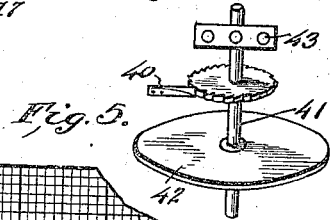

Fig. 5 shows a pawl and ratchet device applied to the armature shaft to prevent the meter from rotating in the reverse direction.

Figure 1:
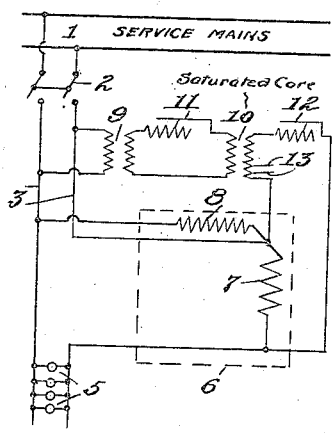
Figure 1 is a diagram showing one method of electrical connections for an excess watt-meter, including the compensator.

In Fig. 1, from the service mains 1, are tapped connections leading to the switch 2, and house-mains 3, which supply the translating devices 5. A watt-meter 6, containing the usual series coil 7 and shunt coil 8, is connected in the usual manner in the circuit. A transformer 9, which may be of the step-down type, supplies current to a compensator 10, which consists of a specially designed transformer operated at above the magnetic saturation point of the iron core, whereby a substantially uniform potential is induced in its secondary, notwithstanding considerable variations in the line voltage. Adjustable resistances 11, 12, either of which may be omitted, are connected as shown, in the primary and secondary of the compensator, to adjust the meter to local conditions; and taps 13, lead from the secondary of the compensator providing a variety of potentials, thereby adapting the meter for use on a great variety of circuits; the secondary of the compensator being connected to the terminals of the series coil 7 of the watt-meter in such a manner that the magnetic effects of the current in its series coil are opposed and neutralized by the compensator current. When properly adjusted, and the contracted-for current is being consumed in the house circuit, the magnetic effects of the series coil 7 are balanced, as above described, and the watt-meter is not actuated. When the current consumed in the house mains exceeds the contracted-for value, the excess over this value is not neutralized or balanced, and accordingly actuates the meter to the extent of the excess and is recorded. By suitably winding and adjusting, a second compensator could be substituted for the transformer 9, thereby giving still greater accuracy.

Figure 2:
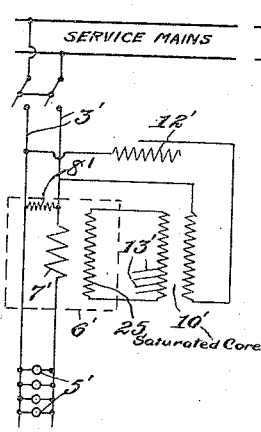
Fig. 2 is a diagram of the meter connections, showing the compensator connected to a neutralizing coil.

In Fig. 2, current passes from the service mains through the house mains 3' to the translating devices 5'. A watt-meter 6', containing the usual series coil 7' and shunt coil 8', is connected in the regular manner in the circuit. A compensator 10' is connected by its primary through the adjustable resistance 12' across the house mains 3'; the secondary of the compensator having taps 13', is connected to the coil 25 which is constructed and located so as to magnetically neutralize and balance the magnetic effect of the series coil 7' upon the rotating element of the watt-meter when the contracted-for current is passing through the series coil. The compensator is initially adjusted by the resistance 12' and the taps 13', as described under Fig. 1, an excess current in the house-mains being recorded as described under Fig. 1.

Figure 3:
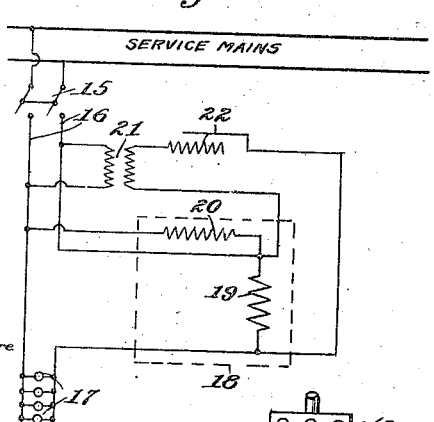
Fig. 3 is a diagram of the meter connections without the compensator.

Fig. 3 illustrates the general method of operation described and claimed in my patent above referred to. Current from the service mains passes through the switch 15 to the house mains 16, supplying the translating devices 17, a watt-meter 18, containing the series coil 19 and shunt coil 20 being connected in the circuit in the usual manner. A small transformer 21 is connected across the house mains, as shown, its secondary being connected through an adjustable resistance 22 and then to the terminals of the series coil 19 of the meter as shown, but not including a compensator 10 described in connection with Fig. 1. This method of operating gives entirely reliable results upon circuits of substantially uniform voltage; but with wide fluctuations in line voltage, it gives less reliable service. By suitably winding and adjusting the compensator, it could also be used direct in place of transformer 21.

In the above illustrations, resistances 11, 12, 12', and 22, may be of either the inductive or non-inductive type.

In Fig. 4, are shown curves A and B, illustrating the watts recorded by the watt-meter at varying voltages, curve A showing the record when the watt-meter is connected as shown in Fig. 1, with the compensator; while curve B shows the record of the watt-meter when connected as in Fig. 3, without the compensator; the curves being made from actual tests. Assuming a voltage of 100, and the watts consumed 140, an increase in line voltage of 5 volts increases the watt-meter record from 140 to 145, an increase of 5, on curve A, with the compensator; while without the compensator, curve B, the recorded wattage is 155, an increase of 15, or three times the error. If the line voltage should increase to 115, the recorded watts with the compensator would be 158, an increase of 18, as shown on curve A; while without the compensator, curve B, it would be 202, an increase of 62, or about 3.5 times the error. With reduced voltages, the compensator also gives more reliable records; with 95 volts on the line, curve A shows a record of 132.5 watts, a decrease of 7.5, while curve B shows 125 watts, a decrease of 15, or twice the error.

The operation of the watt-meter is otherwise the same as described in my prior patent, above referred to; the compensator may be applied to any of the different arrangements of circuits described in that patent. The operation of the watt-meter as connected in Figs. 1, 2, and 3, above described, of this application will serve to illustrate its general application.

As shown in Fig. 5, the rotation of the rotatable armature 42 of the watt-meter in the reverse direction is prevented by the use of a suitable brake such as an intermittent-grip device, a pawl-and-ratchet 40 being shown attached to the spindle of armature 42. Any other equivalent device, either mechanical, electrical, or magnetic, may be used to accomplish the same result.

I claim:—

1. In an apparatus for measuring electric currents, a meter, a coil therein, a compensator, said compensator constructed to supply a current at substantially uniform voltage, the secondary circuit of said compensator electrically connected so as to neutralize and balance the magnetic effect of said coil.

2. In an apparatus for measuring electric currents, a watt-meter having a series coil, a compensator connected to balance said coil, said compensator constructed to supply a current at substantially uniform voltage.

3. In an apparatus for measuring electric currents, a watt-meter having a series coil, a compensator, the secondary of said compensator connected to the terminals of said series coil.

4. In an apparatus for measuring electric currents, a watt-meter having a series coil, a transformer, a compensator, the secondary of said transformer in circuit with the primary of the compensator, and the secondary of said compensator connected to the terminals of said series coil.

5. In a system for measuring electrical energy the combination with a meter having a current coil, of means connected to the line for producing and maintaining across the terminals of said current coil a counter E. M. F. having a substantially constant predetermined value notwithstanding variations in the line voltage.

6. An electric meter comprising in combination a rotatable armature, electromagnetic means for rotating said armature and tending to produce a magnetic field which is a function of the rate of consumption of electric energy, and means, comprising a saturated core transformer whose primary coil is arranged to be energized from the supply circuit to which the meter is adapted to be connected, for negativing the effect of said electromagnetic means while the rate of consumption of energy is less than a predetermined value and for offering a substantially constant opposition to such electromagnetic means while the rate of consumption of energy equals or exceeds said predetermined value, and means for registering the revolutions of said armature.

7. In an electrical measuring instrument the combination of electromagnetic means for producing a magnetic field which is a function of the line current and means comprising a saturated core transformer whose primary coil is arranged to be energized from the supply circuit to which the measuring instrument is adapted to be connected for neutralizing the magnetic effect of such electromagnetic means while the rate of current-flow is less than a predetermined value and for offering a substantially constant opposition to such electromagnetic means while the rate of current-flow equals or exceeds said predetermined value.

8. In an electrical measuring instrument the combination of a rotatable armature, electromagnetic means for rotating said armature and tending to produce a magnetic field which is a function of the line-current and means comprising a saturated core transformer whose primary coil is arranged to be energized from the supply circuit to which the measuring instrument is adapted to be connected for neutralizing the magnetic effect of such electromagnetic means while the rate of current-flow is less than a predetermined value and for offering a substantially constant opposition to such electromagnetic means while the rate of current-flow equals or exceeds said predetermined value.

In testimony whereof I affix my signature in presence of two witnesses.

ALFRED W. BURKE.

Witnesses:
S. ABRAMSON,
ALFRED WHARTENBY.

Copies of this patent may be obtained for five cents each, by addressing the "Commissioner of Patents, Washington, D. C."